(12) United States Patent  
Coff

(10) Patent No.: US 7,905,038 B2
(45) Date of Patent: Mar. 15, 2011

(54) CONTAINER WITH INTEGRATED MEDIA DISPLAY

(76) Inventor: Brian R. Coff, St. Louis, MO (US)

( * ) Notice: Subject to any disclaimer, the term of this patent is extended or adjusted under 35 U.S.C. 154(b) by 625 days.

(21) Appl. No.: 11/616,467

(22) Filed: Dec. 27, 2006

(65) Prior Publication Data

US 2008/0156815 A1 Jul. 3, 2008

(51) Int. Cl.
*G09F 3/00* (2006.01)
(52) U.S. Cl. .......... 40/312; 40/307; 206/459.5
(58) Field of Classification Search .............. 40/306, 40/307, 312
See application file for complete search history.

(56) References Cited

U.S. PATENT DOCUMENTS

| | | | |
|---|---|---|---|
| 1,468,198 A * | 9/1923 | Dunn, Jr. ............. 40/650 |
| 1,647,785 A | 11/1927 | Coughlin |
| 1,857,545 A | 5/1932 | Hill |
| 1,867,455 A | 7/1932 | Humphrey |
| 1,889,765 A | 12/1932 | Switkes |
| 2,252,237 A | 8/1941 | Stiles |
| 2,614,397 A | 10/1952 | Petty |
| 3,016,129 A | 1/1962 | King |
| 3,020,113 A | 2/1962 | Molitor |
| 3,025,947 A | 3/1962 | Hammer |
| 3,130,288 A | 4/1964 | Monaco et al. |
| 3,241,706 A | 3/1966 | Monaco et al. |
| 3,347,346 A | 10/1967 | Young |
| 3,371,816 A | 3/1968 | Ricci |
| 3,424,510 A | 1/1969 | Moon |
| 3,710,589 A | 1/1973 | Brown et al. |
| 3,777,418 A * | 12/1973 | Cooper ............. 434/425 |
| 4,018,585 A | 4/1977 | Loratto |
| 4,106,597 A | 8/1978 | Shook et al. |
| 4,238,934 A | 12/1980 | Hotta |
| 4,243,340 A * | 1/1981 | MacGregor ............ 40/312 |
| 4,336,883 A | 6/1982 | Krug et al. |
| 4,375,758 A | 3/1983 | Simmons |
| 4,441,268 A * | 4/1984 | Scott ............. 40/746 |
| 4,572,598 A | 2/1986 | Moore, Jr. |
| 4,574,594 A | 3/1986 | Simmons et al. |
| 4,662,188 A | 5/1987 | Hullihan |
| 4,785,957 A | 11/1988 | Beck et al. |
| 4,852,741 A | 8/1989 | Van Benschoten |
| 4,979,323 A * | 12/1990 | Wenkman et al. ....... 40/746 |
| 5,257,509 A | 11/1993 | Harris |
| 5,307,647 A | 5/1994 | McClure |
| 5,396,999 A * | 3/1995 | Sandheinrich .......... 206/542 |
| 5,605,056 A | 2/1997 | Brown et al. |
| 5,718,336 A * | 2/1998 | Haarlander ............ 206/542 |
| 5,727,857 A | 3/1998 | Smith |
| 5,755,180 A * | 5/1998 | Smith ............. 119/72 |
| 5,941,016 A | 8/1999 | Welcher |
| 5,975,334 A | 11/1999 | Mayo |
| 6,282,916 B1 | 9/2001 | Price |
| 6,318,114 B1 | 11/2001 | Slaughter |

(Continued)

*Primary Examiner* — Joanne Silbermann
*Assistant Examiner* — Kristina Staley
(74) *Attorney, Agent, or Firm* — Polster Lieder Woodruff & Lucchesi, L.C.

(57) ABSTRACT

A container having an integrated media display includes a base having a storage compartment for holding contents and an orifice for receiving the contents into the storage compartment. A cover is adapted for coupling to the base and closing the orifice and enclosing the storage compartment. A cavity is integrated in an outer surface of the container and has an opening. The cavity is configured for receiving a media insert having at least one visual display and holding the media insert for displaying the visual display through the opening.

24 Claims, 8 Drawing Sheets

U.S. PATENT DOCUMENTS

| | | |
|---|---|---|
| 6,347,706 B1 * | 2/2002 | D'Ambrosio ................ 206/541 |
| 6,370,885 B1 | 4/2002 | Jennings et al. |
| 6,371,296 B1 * | 4/2002 | Rumbough ................ 206/494 |
| 6,471,059 B2 * | 10/2002 | Purvis ........................ 206/459.1 |
| 7,040,115 B1 * | 5/2006 | Lopez et al. ................ 62/457.2 |
| 7,299,919 B1 * | 11/2007 | Eliassof ........................ 206/232 |
| 2002/0108279 A1 * | 8/2002 | Hubbard et al. ................ 40/312 |
| 2006/0289428 A1 * | 12/2006 | Longua ........................ 219/388 |

* cited by examiner

CONTAINER WITH INTEGRATED MEDIA DISPLAY

FIELD

The present disclosure relates to containers and, more particularly, relates to containers having an integrated cavity within a surface of the container for displaying a media display.

BACKGROUND

The statements in this section merely provide background information related to the present disclosure and may not constitute prior art.

Containers are used for storing many articles and contents. For example, a cooler is often used at social gatherings and celebratory events to store and cool refreshments and/or perishable foods that are consumed by guests. Often, multiple coolers are set out for guests to access the beverage of their choice, such as soda, fruit drinks, water, and alcoholic beverages. Other coolers may be used to store perishable food items prior to their consumption or have been used to store medical equipment, supplies, and even transplant organs.

To eliminate the need for someone to open a cooler to determine its contents, it is a common practice to adhesively attach a label to the outside. For example, a portion of the product packaging label can be cut to identify the branded product name and/or product logo. Other labels can be printed or hand written. Such labels can be taped to an outer surface of the cooler. This type of practice is illustrated in FIG. 1. A picnic cooler 100 includes a cover 102 and a base 104. A contents label 105 can be a hand printed label or a portion of the product packaging material that is taped to cover 102 of the cooler 100. The label 105 can be taped to cooler cover 102 with several segments of duct tape 108. The cooler base 104 having a storage compartment for holding contents and an orifice for receiving the contents into the storage compartment Handles 110 are typically located on the sides cooler base 104 (one handle not shown). The label 105 selected for taping to the cooler cover 102 can be the product name and/or product logo for the product stored within the cooler. An engaging mechanism 112 is shown for flexibly coupling the cooler cover 102 to the cooler base 104.

It is existing practice that one cooler is used to store regular sodas, a second cooler to store lower calorie diet sodas, a third for regular beers, a fourth for lower or light calorie beers, and a fifth cooler for non-alcoholic fruit drinks. Each cooler may then be marked with its own taped display label identifying its contents. Alternatively, labeling for the cooler may consist of writing the name of the owner and/or stored product on cardboard-like material with a marker pen, again duct taping the material to a surface. Alternatively, writing the labeling information directly on the surface using a marker pen can also serve to identify its contents and/or owner.

The use of tape (such as duct tape) to attach a contents label to a cooler can require cleaning the exterior surface of the cooler after use, as once the label and tape are removed, a sticky residue may remain on the cooler surface. This may require the use of cleaning chemicals to adequately clean the cooler surface and subsequent disposal of the cleaning solution. Additionally, waste disposal is also required for the removed duct tape and the used display label. Cleaning chemicals may also be required to remove marker pen residue from cooler surfaces when surfaces are directly labeled with an erasable marker pen.

SUMMARY

The inventor hereof has recognized a need for improving the ease of identifying the contents and/or ownership of a cooler using existing materials, reducing the clean-up requirements of cooler surfaces after use, and reducing the amount of materials that require disposal after use. The inventor hereof has succeeded at designing containers having an integrated media display for displaying and/or identifying the contents stored within the container and/or the ownership of the container. Various integrated media display embodiments disclosed herein overcome the aforementioned disadvantages of labeling containers while providing cost benefits and advertising by using existing display packaging materials as the media display.

In one aspect, a container having an integrated media display includes a base having a storage compartment for holding contents and an orifice for receiving the contents into the storage compartment. A cover is adapted for coupling to the base and closing the orifice and enclosing the storage compartment. A cavity is integrated in an outer surface of the container and has an opening. The cavity is configured for receiving a media insert having at least one visual display and holding the media insert for displaying the visual display through the opening or transparent portion thereof.

In another aspect, a cooler having an integrated media display includes a base having a thermally insulated storage compartment for holding contents and an orifice for receiving the contents into the storage compartment. A cover is adapted for coupling to the base and closing the orifice and enclosing the storage compartment. Also included are means for receiving a media insert having a visual display and means for displaying the visual display of a received media insert external to the cooler.

In yet another aspect, a method for identifying contents of a cooler including cutting a media insert having at least one visual display to outer dimensions about equivalent to an insert cavity integrated in an outer surface of the cooler, and inserting the media insert in the insert cavity. The media insert is positioned in the insert cavity for displaying the visual display through a window of the insert cavity.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments of the disclosure, are intended for purposes of illustration only and should not be construed as limiting the scope of the disclosure.

BRIEF DESCRIPTION OF THE DRAWINGS

The present disclosure will become more fully understood from the detailed description and the accompanying drawings.

Corresponding reference characters indicate corresponding parts throughout the several views of the drawings.

DETAILED DESCRIPTION

The following description is merely exemplary in nature and is not intended to limit the present disclosure or the disclosure's applications or uses.

In one embodiment, a container having an integrated media display includes a base having a storage compartment for holding contents and an orifice for receiving the contents into the storage compartment. Such a container can include a cooler, picnic cooler, or ice chest or any other container in which contents are stored. A cover is adapted for coupling to the base and closing the orifice and enclosing the storage compartment. The cover can be removable or attached, such as with a hinge that rotates for allowing a user to access the storage compartment of the container that is enclosed by the cover. A cavity is integrated in an outer surface of the container (which could be the cover and/or the base) and has an opening. The cavity is configured for receiving a media insert having at least one visual display and holding the media insert for displaying the visual display through the opening.

Figure 1:
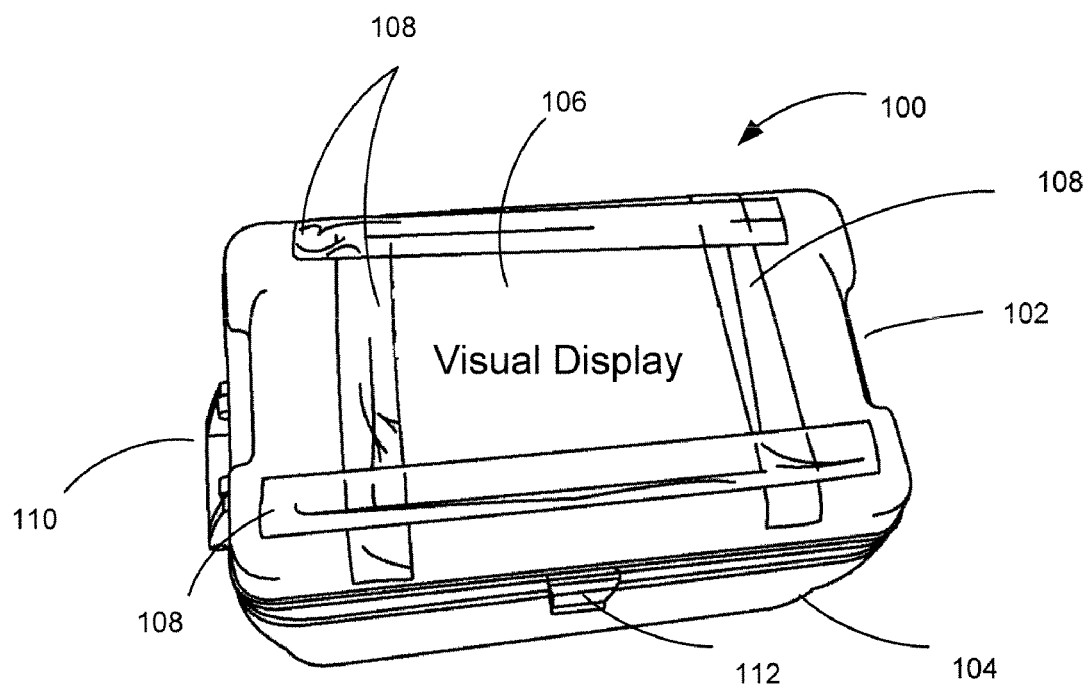
FIG. 1 is a top perspective view of a container with a portion of a product packaging material duct-taped to a cover of a base of the container as known in the art.
Figure 2:
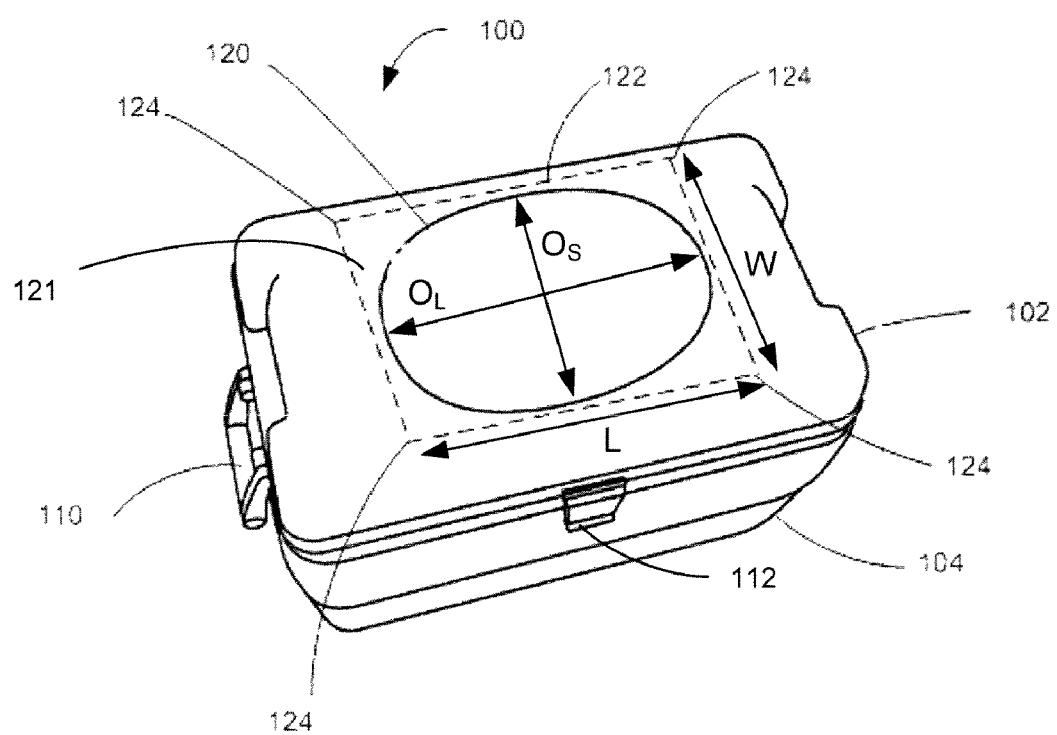
FIG. 2 is a top perspective view of a cooler container having a rectangular base, a cover coupled to the base, and a cavity integrated within the cover configured for receiving a media insert according to one exemplary embodiment.

One exemplary embodiment of a container 100 with an integrated media display is illustrated in FIG. 2. A cover 102 includes a recessed cubical cavity 121, which can have a generally rectangular base 122 of length L, width W, and depth D (not shown) and corners 124 configured and dimensioned for receiving a media insert having at least one visual display and holding the media insert for displaying the visual display. The cavity 121 includes a first portion defining a window into the cavity 121 (e.g., an oval-shaped window) and a second portion (e.g., rectangular base) for holding the media insert in a position for displaying the visual display to the outer surface. The first portion and second portion of the cavity 121 are molded in the outer surface of the container 100, the second portion having a larger cross-sectional area than the first portion for receiving a media insert, wherein the smaller cross-sectional area of the first portion is adapted for retaining a media insert within the second portion. The first and second portions are dimensioned for receiving a flexible media insert through the first portion, guiding the flexible media insert into the second portion and securing the flexible media insert within the second portion.

In this exemplary embodiment, the oval-shaped window of cavity 121 of the integrated media display 120 is offset from the recessed rectangular base (not shown) by a depth that is less than the depth D of the recessed rectangular-base cube, such that the top surface of the oval-shaped window of cavity 121 typically resides in the same plane as the top surface of cover 102. The perimeter of the oval-shaped window has a tapered profile that serves to directionally guide the corners of the media insert downwardly toward the corners of the recessed rectangular base 122 when inserted into the cavity 121 of the integrated media display 120. The long axis $O_L$ of the oval-shaped window is dimensioned to be less than L, and the short axis $O_S$ of the oval-shaped window is dimensioned to be less than W. The cavity 121 of the integrated media display 120 also includes a recessed cube having a rectangular base further defining a portion of the cavity 121 within which the media insert is inserted and retained. The cavity 121 of the integrated media display 120 on cover 102 can be dimensioned and configured to accommodate containers 100 of varying sizes. For example, the cooler 100 can be of a cylindrical design with a circular cover 102 configured for coupling to a cylindrical base 104. Alternatively, the cooler 100 may be configured as a cube having a square cover 102 configured for coupling to a cubical base 104. In another embodiment, the cooler 100 can have a rotatable cover 102 that rotates about an axis (not shown) that is defined by the base 104. In some cooler embodiments, the base and cover can include thermal insulating material for enabling contents to remain cold for an extended period. In some embodiments, the cavity 121 includes a surface adapted as a dry erasable surface that can be used with a marker pen for labeling the surface.

Figure 3:
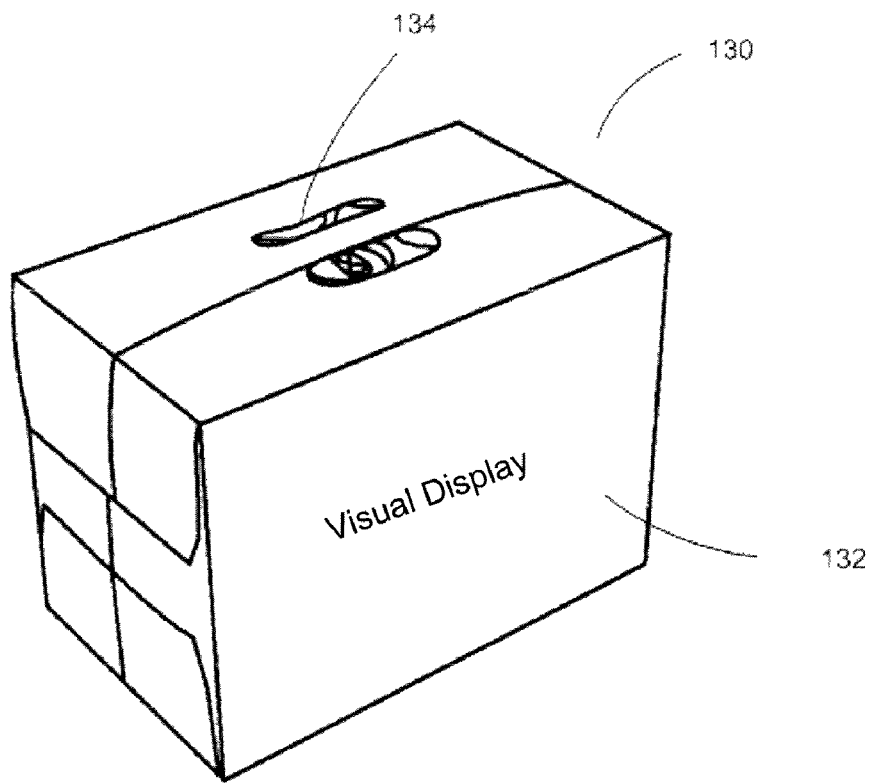
FIG. 3 is a perspective view of an assembled cardboard packaging material for retaining canned beverages.
Figure 4:
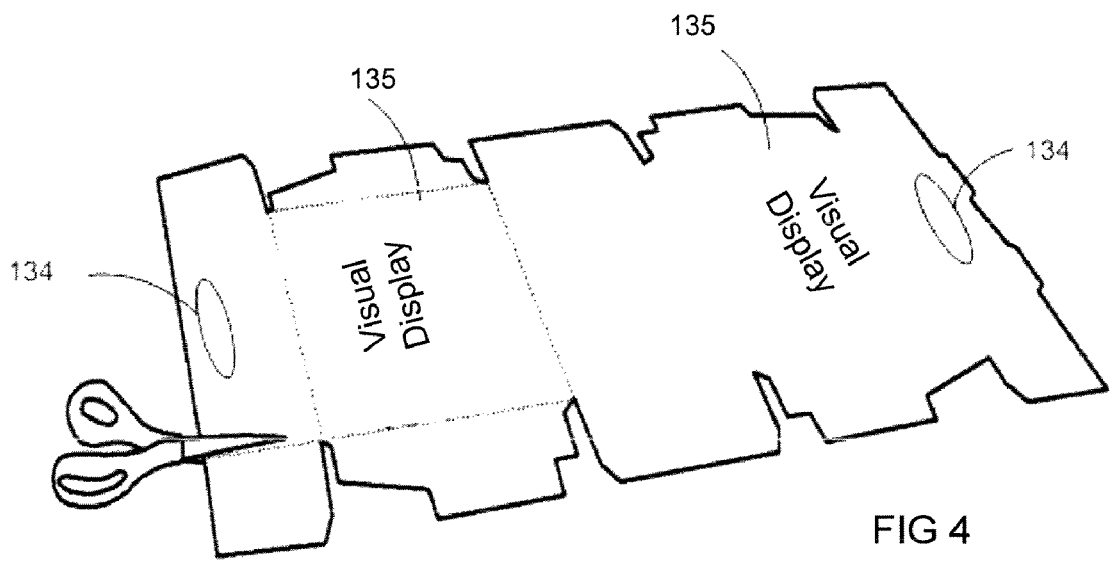
FIG. 4 is a perspective view of the unassembled cardboard packaging material of FIG. 3 illustrating the preparation of a media insert having at least one visual display from the product packaging according to one exemplary embodiment.

FIG. 3 is a perspective view of an assembled package configured for displaying and retaining beverages typically seen at retail outlets. FIG. 4 illustrates the packaging material before assembly. The packaging material typically has media insert 135 and hand cutouts 134 to facilitate carrying the packaged beverages. The media insert 135 and hand cutouts 134 are typically designed for stacking the assemblies as an aggregated product display. The media insert 135 is designed to create readily recognizable consumer product branding images and often include a product's trademarked logo. Thus, the media insert 135 of the product package can be adapted to function as a media display for a cooler containing the product. FIG. 4 illustrates the cutting of the media insert 135 of the packaging material to serve as a display for insertion into an oval-shaped cavity 121 of the integrated media display 120 for cooler 100.

Figure 5:
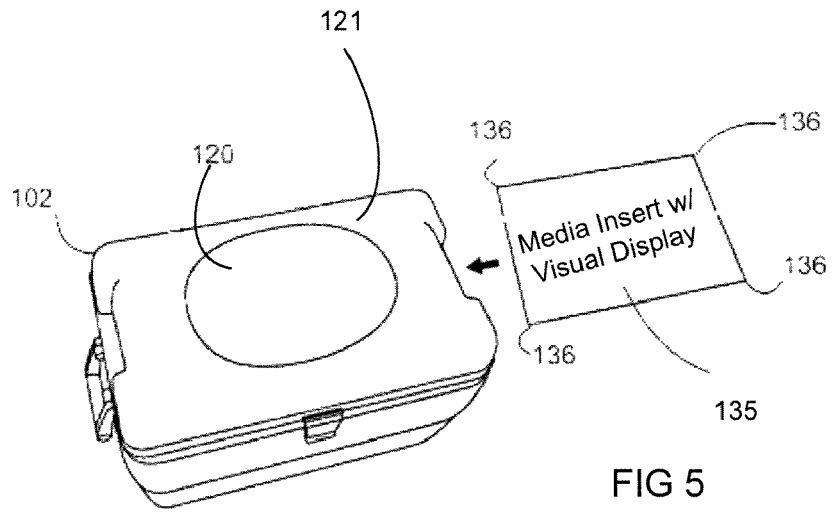
FIG. 5 is a perspective view illustrating the cooler of FIG. 2 and a media insert having at least one visual display prepared from the product packaging before insertion of the media display into the cavity according to some exemplary embodiments.
Figure 6:
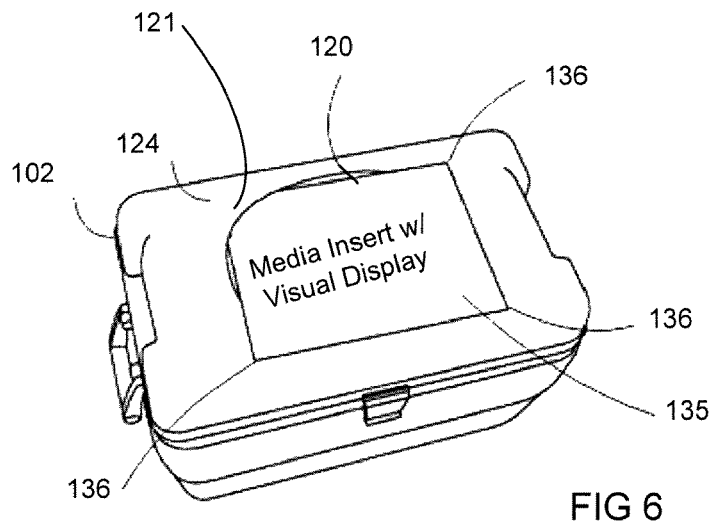
FIG. 6 is a perspective view illustrating insertion of a flexible media insert display into a recessed corner beneath an oval display cavity according to one exemplary embodiment.
Figure 7:
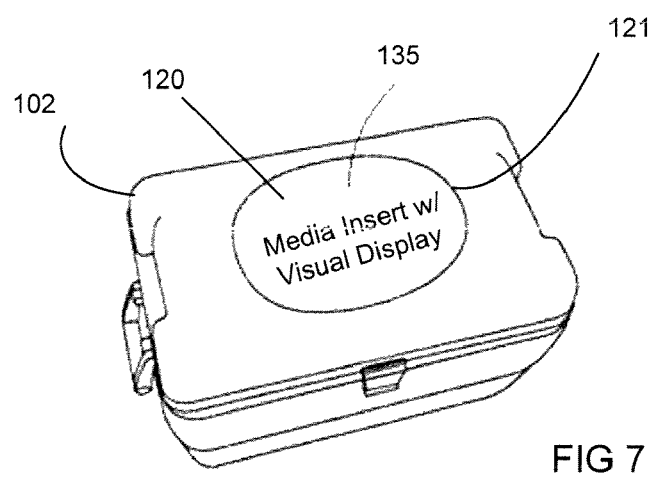
FIG. 7 is a perspective view of the cooler of FIG. 5 after insertion of the media insert display into the cavity according to one exemplary embodiment.

FIGS. 5-7 illustrate the sequence of inserting media insert 135 into an oval-shaped cavity 121 of the integrated media display 120. FIG. 5 shows the cooler and media insert 135 before insertion of the media insert 135 within the oval-shaped cavity 121. FIG. 6 illustrates how a given media insert corner 136 is inserted into the oval-shaped cavity 121 and aligned to a specific corner 124 of the recessed rectangular-shaped base. Each individual media insert corner 136 is sequentially inserted and aligned to its respective corner 124 of the recessed rectangular-shaped base cavity, and the media insert 135 is pushed downward toward into its retained position. In some embodiments, the use of an oval shape has the benefit of guiding and facilitating the insertion of each corner of the media insert 135 within its corner cavity. The length and width of the media insert 135 is dimensioned and configured to be smaller than the length L and width W of the recessed rectangular-shaped base cavity in order to facilitate later removal of the media insert 135.

While the illustrated embodiment in FIGS. 5-7 show the use of the media insert 135 of a product package as the display for the cooler, alternative media insert 135 can be used as the illustrated embodiment is not intended to limit the scope of this disclosure. For example, a reusable flexible plastic-coated promotional advertising media insert 135 can be used as the media insert 135 in some embodiments. Alternatively, the cavity 121 can be dimensioned to accommodate a plastic-coated photograph as the media insert 135 for insertion within the cavity 121. In some embodiments, the cavity 121 can be rectangular in shape for displaying a family photograph or corporate group photograph, by way of example. In another embodiment, the media insert 135 can be a flexible whiteboard-like material suitable for use with a felt marker pen for writing information on the media insert 135. In some embodiments, the media insert 135 can be a personalized flexible table place mat having imprinted product or event advertising.

Figure 8:
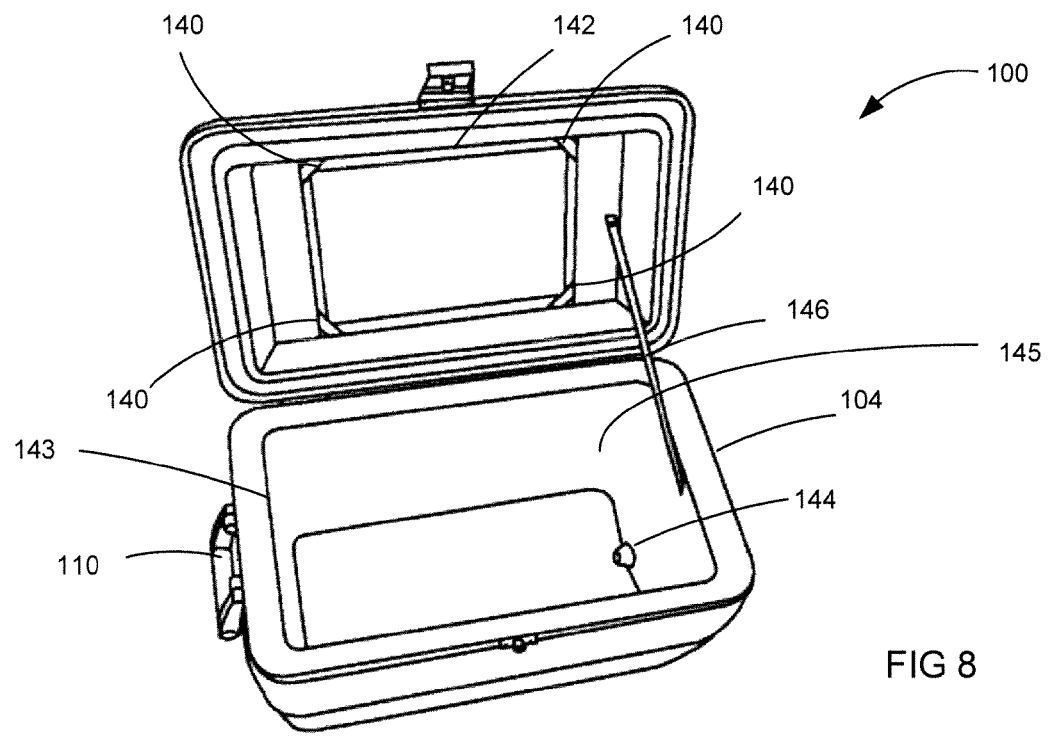
FIG. 8 is a perspective view of an opened cooler with a storage area beneath the cover for storing a media stencil defining the media insert display area to be cut from packaging material according to one exemplary embodiment.
Figure 9:
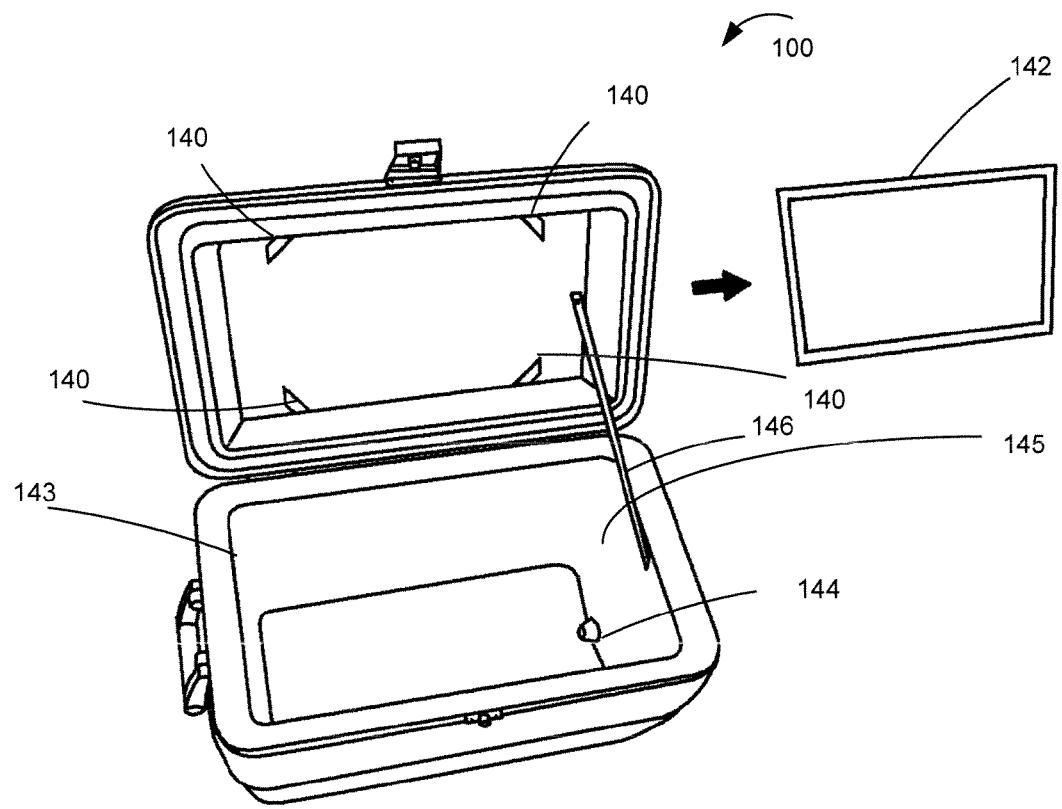
FIG. 9 is a perspective view of the cooler of FIG. 8 with the media insert display stencil removed from the underside of the cooler cover illustrating the retaining fixtures attached to the underside of the cover for storing the stencil when not in use according to one exemplary embodiment.

Referring to FIGS. 8-9, the storage and use of a media insert stencil 142 is illustrated. In this embodiment, the underside of cover 102 has four retaining fixtures 140 (such as a bracket, by way of example) for retaining and storing a stencil 142. The cover 102 is configured and dimensioned for coupling to the base 104 and closing orifice 143 of storage compartment 145, thereby enclosing the storage compartment 143. The stencil 142 can be placed over advertising or product packaging material to mark and delineate the portion of the material to be cut and used as a media insert 135 within a cavity 121 of the cover 102. The stencil 142 can have a textured surface that serves to adhere to the packaging surface, thereby providing stability when using the stencil 142 to outline the media insert 135 boundaries to be cut. The cooler 100 is shown with cover 102 supported in an open position via hinge 146. Also shown is a drain 144 for draining fluid contents from the compartment 143. FIG. 9 shows the cooler of FIG. 8 with stencil 142 removed from its retaining fixtures 140. While the illustrated stencil 142 and its retaining fixtures 140 are configured for receiving a rectangular-shaped stencil 142, other geometrically dimensioned stencils 142 and associated retainer fixtures 140 can be configured and are considered to be within the scope of the disclosure. In some embodiment, a circular stencil 142 for use with a cylindrically-shaped cooler can be included, by way of example. The disclosed stencil 142 and retaining fixture 140 configurations of FIGS. 8-9 are not intended to limit the scope of this disclosure. In another embodiment, a table place mat (not shown) can be used as the media insert 135, the stencil 142 and retaining fixtures 140 can be dimensioned to retain a set of table place mats for storage in the compartment 143 when not in use.

Figure 10:
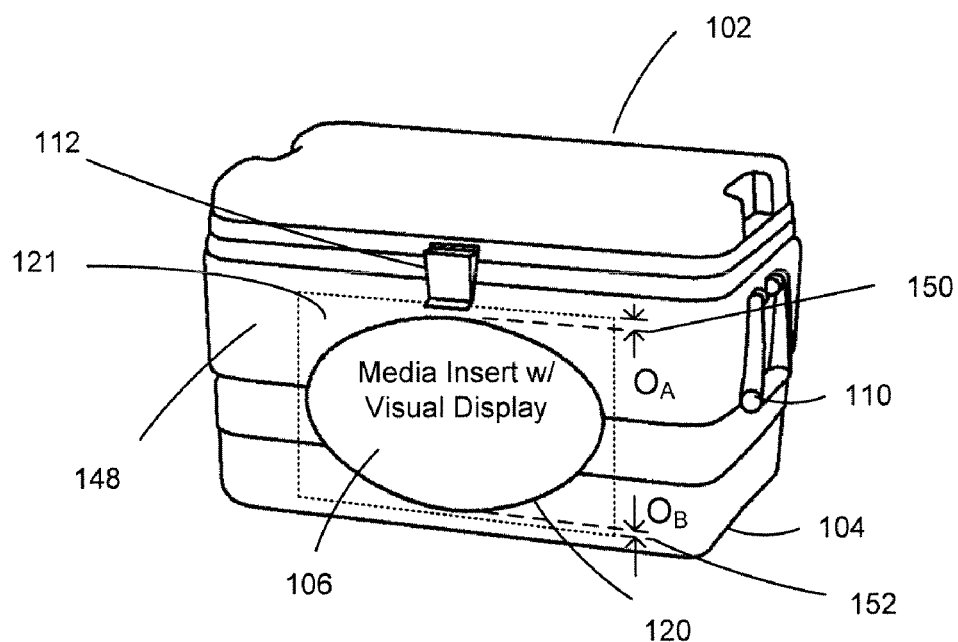
FIG. 10 is a front perspective view of an integrated media insert display within a front surface of a picnic cooler according to another exemplary embodiment.

FIG. 10 shows another cooler with an oval-shaped cavity 121 for an integrated media display 120 according to another embodiment. As shown, a front face 148 of the base 104 includes the cavity 121 having a first portion providing a display window and a second portion (the recessed rectangular-shaped base portion of the cavity 121) for receiving the media inert. A shown, the recessed rectangular-shaped base portion of the cavity 121 lies under the oval-shaped window portion of the cavity 121 of the integrated media display 120. The cavity 121 is dimensioned and configured to provide additional vertical space for warping and maneuvering the media insert 135 into place at the top of the cavity 121 of the oval-shaped window portion of the cavity 121. Offset $O_A$ 150 is the difference between the height of the top of the embedded rectangle and the height of the oval-shaped window of cavity 121 and is dimensioned to be greater than offset $O_B$ 152. Offset $O_B$ 152 is the difference between the bottom of the embedded rectangle and the bottom of the oval-shaped window portion of the cavity 121. The gravitational pull on the media insert 135 allows a reduction of the area at the bottom of the cavity 121 because of additional working area at the top.

Figure 11:
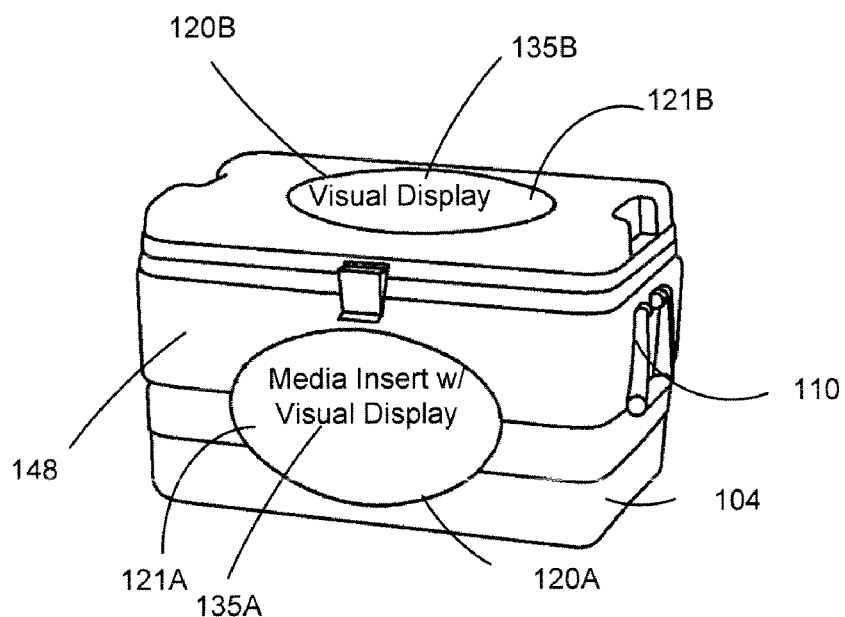
FIG. 11 is perspective view of a container having two cavities for receiving and displaying media inserts, one on the cover and one on a front surface of the base, according to one exemplary embodiment.

Referring to FIG. 11, an embodiment of a cooler having cavities 121 forming two integrated media insert displays 120 is illustrated. A first embedded oval-shaped windowed cavity 121A of integrated media display 120A in the front face 148. A second integrated oval-shaped cavity 121B is in the cover 102. Each integrated media display 121A and 121B has a media insert, 135A and 135B, respectively. While this embodiment is illustrated with two oval-shaped window cavities 121A and 121B of integrated media displays 120A and 120B, other integrated media display shape embodiments can be configured and dimensioned. One cavity 121 can have an oval shape and a second cavity 121 can have a rectangular shape, for example. Of course, other shapes are also possible and still considered to be within the scope of the present disclosure.

Figure 12:
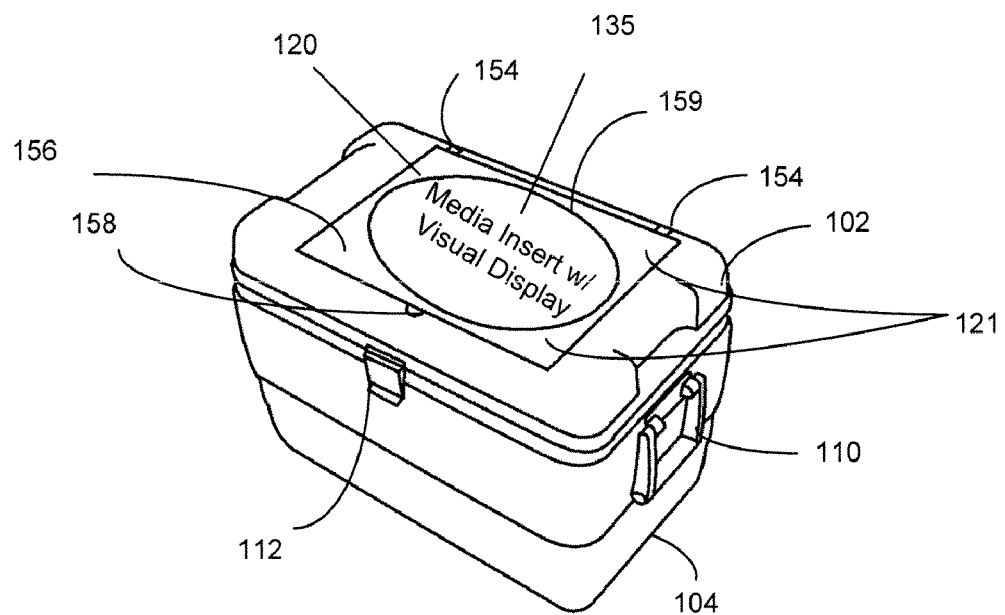
FIG. 12 is a top perspective view of a container with a cavity for receiving and displaying a media insert within the cover having a securing frame for receiving and securing a media insert within a display cavity according to another embodiment.
Figure 13:
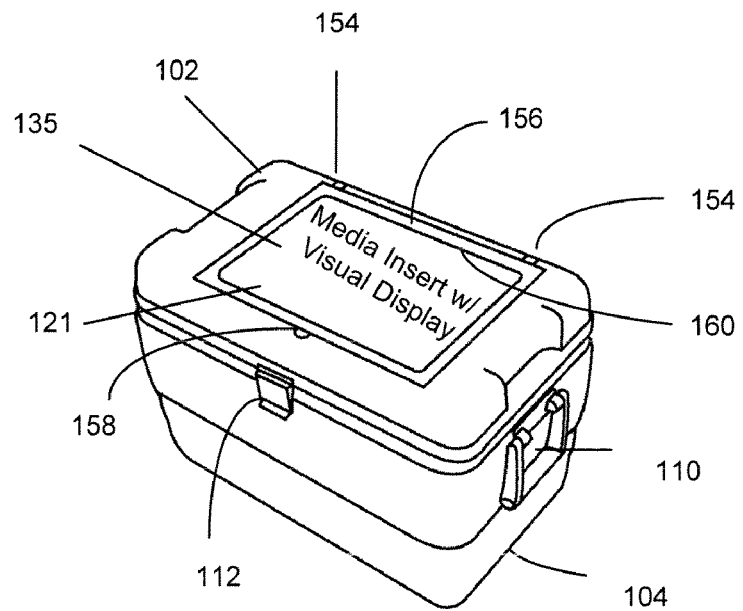
FIG. 13 is a top perspective of a container with a cavity for receiving and displaying a media insert within the cover and a securing frame for lifting and inserting a media insert display according to one embodiment.

FIGS. 12 and 13 show additional integrated media display embodiments that include a removable or hinged display frame insert 156 within the cover 102. The display frame 156 can also be inserted into the cavity 121 for securing the media insert 135 within cavity 121. When the display frame 156 is hinged, as shown in FIGS. 12 and 13, the display frame 156 functions similar to a door with the display frame 156 vertically rotating about the axis of hinges 154 when opened and closed. A recessed finger engagement slot 158 beneath the display frame facilitates lifting the display frame when the display frame is closed. Display frame 156 of FIG. 12 includes an oval-shaped window 159 within display frame insert 156. FIG. 13 has a rectangular window 160 within display frame insert 156. A display frame insert 156 can be dimensioned to be slightly larger than the media insert 135 or the visual display contained thereon to provide a tighter fit with the media insert inserted therein. Alternative media insert 135 shapes and geometries can be configured within a display frame insert 15 as the illustrated embodiments are not intended to limit the scope of the embodiment. A plurality of shapes can be included by or within the display frame insert 156 in some embodiments, as an example.

Figure 14:
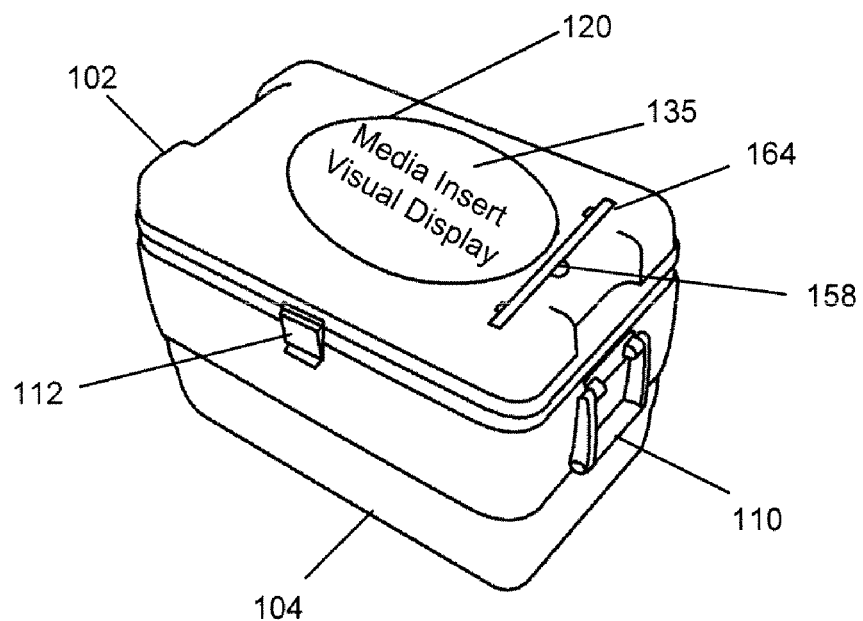
FIG. 14 is a top perspective view of a container having a cavity configured for receiving media insert is inserted beneath an oval portion of the cavity within the cover through a slot configured for inserting a media insert according to one embodiment.
Figure 15:
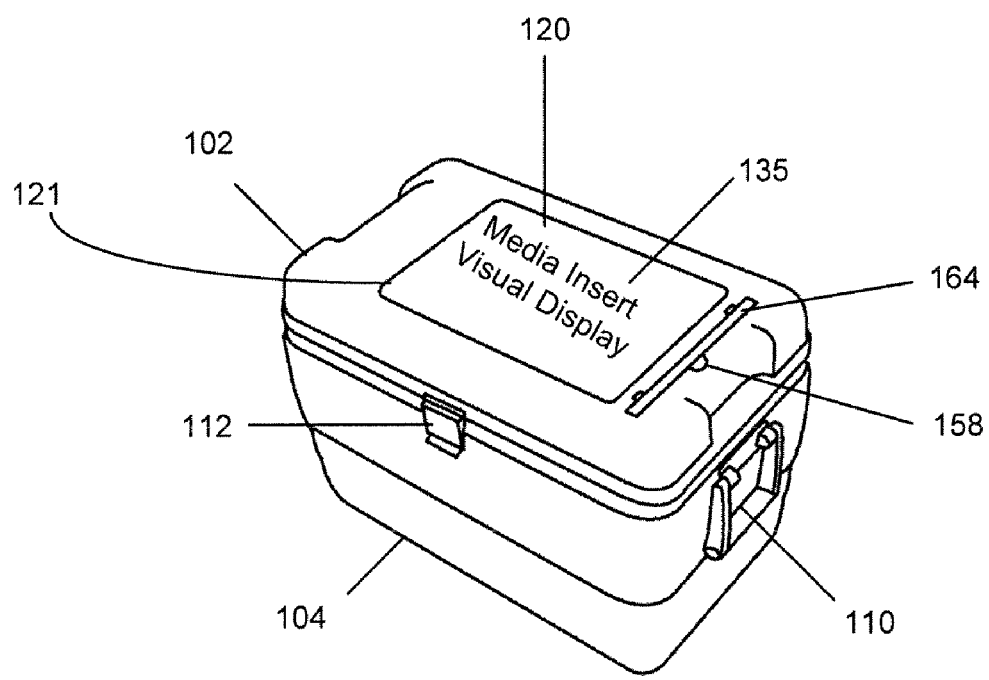
FIG. 15 is a top perspective view of a container having a media insert cavity and a slot for inserting a media insert display into the cavity according to another embodiment.

FIGS. 14 and 15 show additional embodiments for integrated media displays 120 having cavities formed within the cover 102 that include a display insertion slot orifice 164 and a recessed finger engagement slot 158. The cavity 121 of FIGS. 14 and 15 are dimensioned and extended lengthwise to receive a media insert 135 through a media insert insertion slot orifice 164. The rectangular-shaped cavity 121 can be dimensioned for a tighter fit with the media insert 135. The media insert 135 embodiment of FIG. 14 is configured for an oval-shaped window of the cavity 121 of a media insert display 120. The media insert display embodiment of FIG. 15 is configured for a rectangular-shaped media insert display 120. Each recessed finger engagement slot 158 is configured and dimensioned to facilitate both insertion and removal of media insert 135. While the illustrated display window geometries include an oval and rectangular-shaped window, alternative display window geometries and designs can be accommodated. In some embodiments, the window can be a transparent window pane made from a transparent plastic material for substantially closing the window, by way of example.

Figure 16:
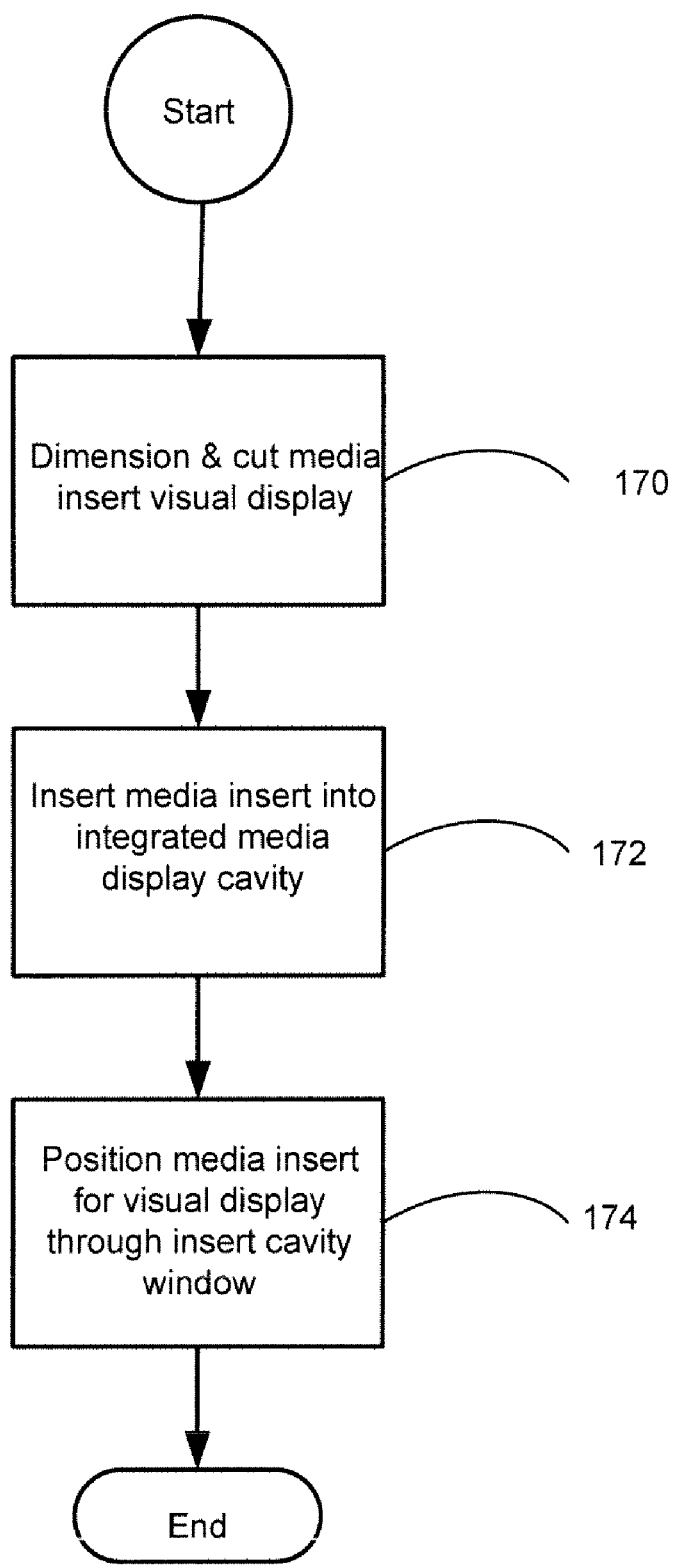
FIG. 16 is a flowchart of a method for identifying contents of a cooler according to one exemplary embodiment.

FIG. 16 illustrates a method for identifying the contents of a cooler. In process 170, a media insert having at least one visual display is cut to outer dimensions about equivalent to an insert cavity integrated in an outer surface of the cooler. The media insert is inserted into the insert cavity in process 172. In process 174, the media insert is positioned within the insert cavity for displaying the visual display through a window of the insert cavity.

While various illustrated embodiments show a single integrated media display within a single surface, alternative embodiments can include a plurality of integrated media displays within a plurality of surfaces configured and dimensioned for specific picnic cooler display applications. It will be understood that many of the details herein given may be varied considerably by those skilled in the art without departing from the spirit and scope of this disclosure. Accordingly, all matter contained in the above description or shown in the accompanying drawings should be interpreted as illustrative and not in a limiting sense.

When describing elements or features of the present disclosure or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

What is claimed is:

1. A cooler container having an integrated media display, the container comprising:
    a base forming an ice chest with an insulated water-tight storage compartment for holding ice and a plurality of beverages as contents and an orifice at a top for receiving the contents into the insulated storage compartment, the base having a monolithic structure formed from a plurality of insulated side walls and an insulated floor coupled to each of the side walls and opposing the top;
    a cover having an exposed top surface, a bottom surface, and an insulated body, the cover being adapted for coupling to the base and closing the top orifice of the ice chest and enclosing the insulated storage compartment; and
    a cavity having a rectangular shape integrated between the outer surface and the bottom surface of the cover and having a top opening in the top surface of the cover having an oval shape that is operatively coupled to the cavity, the top opening configured for receiving a rectangular shaped media insert by flexing the media insert including each of four corners that are curved inward for placement of the flexed media insert through the oval top opening and into corresponding corners of the rectangular cavity and the cavity configured for receiving and storing the media insert after being received by the top opening in a substantially planar position, wherein the top opening is configured for displaying a visual display of the media insert received within the cavity.

2. The cooler container of claim 1 wherein the cover is flexibly attached to the base for enabling a user to open the cover and access the storage compartment without separating the cover completely from the base.

3. The cooler container of claim 1 wherein the oval shaped opening and the cavity are each molded as a monolithic cavity in the outer surface of the cover, the cavity having a larger cross-sectional area than the oval shaped opening for receiving the media insert with the flexed corners, and wherein the smaller cross-sectional area of the oval shaped opening is adapted for retaining the media insert within the cavity in the substantially planar position.

4. The cooler container of claim 3 wherein the cavity defines an opposing parallel surface offset from the exposed top surface of the cover for receiving and retaining the media insert.

5. The cooler container of claim 4 wherein the oval shaped opening is dimensioned for receiving the media insert with its corners flexed through the opening and guiding the flexed corners of the media insert into the planar position within the cavity and securing the media insert within the cavity in the substantially planar position.

6. The cooler container of claim 1, wherein the oval shaped opening and the cavity are each molded in the outer surface of the cover, the cavity having a larger cross-sectional area than the oval shaped opening for receiving the media insert with the flexed corners, and wherein the smaller cross-sectional area of the oval shaped opening is adapted for retaining the media insert within the cavity in the substantially planar position, further comprising a frame insert defining at least a portion of the oval shaped opening and adapted for releasable attachment for securing the oval shaped opening to the top surface of the cover.

7. The cooler container of claim 1, further comprising a transparent window pane having a rectangular shape and being of a flexible material for substantially closing the oval shaped opening after receiving of the media insert, the top opening being configured for receiving the transparent window pane which is flexed with one or more flexed corners following receipt of the media insert, the window pane being received with each of the four flexed corners being curved inward for placement through the oval top opening and into corresponding corners of the rectangular cavity and the cavity configured for receiving and storing the window pane in addition to the media insert in a substantially planar position.

8. The cooler container of claim 1 wherein the base of the ice chest has a shape selected from the group consisting of a rectangular-shaped box, a cube, and a cylinder.

9. The cooler container of claim 1, further comprising a stencil adapted for enabling a user to prepare the media insert having proper dimensions for flexing of the media insert including one or more corners for insertion into the oval shaped opening and into the cavity.

10. The cooler container of claim 9 wherein the stencil is adapted for enabling the user to cut the media insert from a packaging containing the contents to be stored in the storage compartment.

11. The cooler container of claim 10 wherein the bottom surface of the cover defines an inner surface of the storage compartment, further comprising a retaining fixture positioned to the bottom surface of the cover adapted for receiving and releasably retaining the stencil.

12. The cooler container of claim 1 wherein the cavity includes a surface adapted as a dry erasable surface.

13. The cooler container of claim 1 wherein the base forming the ice chest and the cover are composed of integrally molded materials.

14. The cooler container of claim 1 wherein a perimeter of the oval-shaped opening has a tapered profile from the outer surface towards the inner rectangular cavity, the tapered profile directionally guiding the corners of the media insert downwardly toward the corners of the recessed rectangular base when the media insert is inserted into the cavity.

15. A cooler having an integrated media display comprising:
   a base forming an ice chest having a thermally insulated water-tight storage compartment defined as a monolithic structure by insulated sides and an insulated floor for holding ice and a plurality of beverages as contents and a top orifice opposing the insulated floor for receiving the contents into the storage compartment;
   a cover adapted for coupling to the base and closing the top orifice and enclosing the storage compartment;
   means for receiving a media insert having a visual display with the media insert being flexed including one or more corners of the media insert being flexed inward, wherein said means for receiving includes receiving the flexed media insert through an oval opening, said means for receiving the media insert being formed in at least one of an outer surface of one of the insulated sides of the base of the cooler and an outer surface of the cover; and
   means for storing and displaying the visual display of the received media insert external to the cooler.

16. The cooler container of claim 15 wherein the base forming the ice chest and the cover are composed of integrally molded materials.

17. A method for identifying contents of a cooler comprising:
   cutting a flexible media insert having at least one visual display to a rectangular shape four corners that can be flexed inward and having outer dimensions about equivalent to a cavity having a rectangular shape that is integrated between a top surface and a bottom surface of a cover of the cooler, the cooler having a base forming an ice chest with an insulated water-tight storage compartment for holding ice and a plurality of beverages as contents and an orifice at a top for receiving the contents into the insulated storage compartment, the base having a monolithic structure formed by a plurality of insulated side walls and an insulated floor coupled to each of the side walls and opposing the top, the cover having the top surface that is exposed and an insulated body and is adapted for coupling to the base and closing the top orifice of the ice chest and enclosing the insulated storage compartment, and the cavity having a top opening in the top surface of the cover having an oval shape that is operatively coupled to the cavity, the top opening configured for receiving a rectangular shaped media insert by flexing the media insert including one or more of the four corners to be curved inward for placement of the flexed corners through the oval top opening and into corresponding corners of the rectangular cavity and the cavity configured for receiving and storing the media insert after being received by the top opening in a substantially planar position, wherein the top opening is configured for displaying a visual display of the media insert received within the cavity;
   inserting the flexed media insert including the one or more flexed corners through the oval-shaped opening on the top surface of the cover; and
   positioning the media insert in the cavity in a substantially planar position for displaying the visual display through the oval-shaped opening on the top surface of the cover.

18. The method of claim 17, further comprising positioning a stencil on packaging associated with the contents of the cooler, wherein cutting includes cutting about an outline of the positioned stencil.

19. The method of claim 18, further comprising storing the stencil in a holding fixture on an underside of the cover enclosing a storage compartment of the cooler.

20. The method of claim 17 wherein inserting includes flexing the media insert including flexing each of the four corners of the media insert inward and positioning the flexed media insert including the inwardly flexed corners through the oval-shaped opening and expanding the four flexed corners into corresponding corners of the rectangular shaped cavity.

21. The method of claim 17, further comprising releasably attaching a frame insert into a portion of the cavity for securing the inserting and positioned media insert within the insert cavity.

22. The method of claim 17, further comprising forming the insert cavity into the outer surface of the cover.

23. The method of claim 17 wherein inserting the media insert through an oval-shaped opening by flexing the media insert including each of four corners of the media insert includes placing the media insert through the oval top opening with each of four corners flexed to be curved inward and each flexed corner being placed into corresponding corners of the rectangular cavity.

24. The cooler container of claim 17 wherein a perimeter of the oval-shaped opening has a tapered profile from the outer surface towards the inner rectangular cavity, the tapered profile directionally guiding the corners of the media insert downwardly toward the corners of the recessed rectangular base when the media insert is inserted into the cavity.

* * * * *